US006760513B1

(12) United States Patent  (10) Patent No.: US 6,760,513 B1
Heitmann et al.  (45) Date of Patent: Jul. 6, 2004

(54) METHOD USING PHOTONIC CRYSTALS FOR THE DISPERSION COMPENSATION OF OPTICAL SIGNALS OF DIFFERENT WAVELENGTHS WHICH ARE TRANSMITTED TOGETHER

(75) Inventors: Walter Heitmann, Gross-Biberau (DE); Hans W. P. Koops, Ober-Ramstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/937,579
(22) PCT Filed: Mar. 21, 2000
(86) PCT No.: PCT/EP00/02479
§ 371 (c)(1),
(2), (4) Date: Dec. 20, 2001
(87) PCT Pub. No.: WO00/59140
PCT Pub. Date: Oct. 5, 2000

(30) Foreign Application Priority Data

Mar. 26, 1999 (DE) .......................................... 199 15 139

(51) Int. Cl.⁷ .............................. G02B 6/34; H04B 10/18
(52) U.S. Cl. .............................. 385/27; 385/24; 398/159
(58) Field of Search .......................... 385/24, 27, 37.1, 385/22, 123, 14, 7; 398/158, 159

(56) References Cited

U.S. PATENT DOCUMENTS

| | | | |
|---|---|---|---|
| 5,802,236 A | | 9/1998 | DiGiovanni et al. |
| 5,808,403 A | | 9/1998 | Clerc ........................ 313/336 |
| 6,373,609 B1 | * | 4/2002 | Mizrahi ...................... 398/158 |
| 2002/0034360 A1 | * | 3/2002 | Ishii ............................ 385/37 |
| 2002/0172456 A1 | * | 11/2002 | Hosomi et al. ............... 385/27 |
| 2003/0030870 A1 | * | 2/2003 | Joannopoulos et al. ..... 359/161 |

FOREIGN PATENT DOCUMENTS

| | | |
|---|---|---|
| DE | 196 34 893 A1 | 5/1997 |
| EP | 0 753 944 | 1/1997 |
| EP | 0 810 453 A1 | 12/1997 |
| WO | WO 99/00956 | 1/1999 |

OTHER PUBLICATIONS

Koops, H. W. P. et al., "Photonic Crystals Built By Three–Dimensional Additive Lithography Enable Integrated Optics Of High Density", Proceedings Of the SPIE, US, Bellingham, Virgina, vol. 2849, Aug. 5, 1996, pp. 248–256.
"Optische Telekommunikationssysteme" by H. Hultzsch, Damm Publishers, Gelsenkirchen (1996) pp. 123, 152–153, 296–298.
J. D. Joannopoulus et al.: Photonic Crystals: Molding the Flow of Light, ISBN 0–691–03744–2 (1995).
International Search Report for Application No. PCT/US01/42803, dated Dec. 9, 2002 (mailing date).

* cited by examiner

Primary Examiner—Brian Healy
Assistant Examiner—Kevin S. Wood
(74) Attorney, Agent, or Firm—Kenyon & Kenyon

(57) ABSTRACT

The present invention is directed to an economical approach for compensating for the dispersion of optical signals having different wavelengths.

Figure 1:
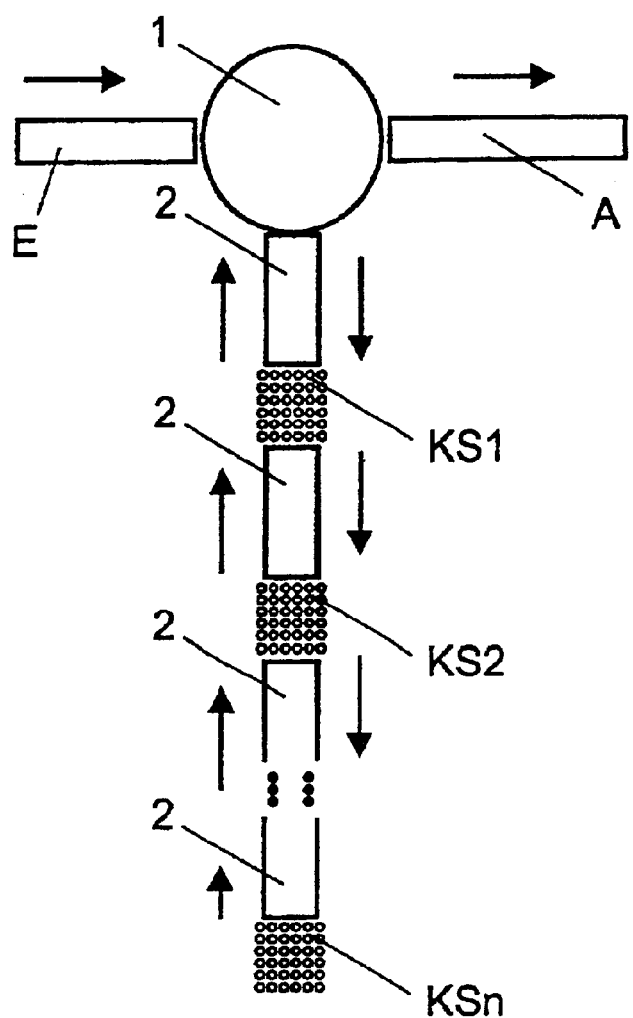

In accordance with the present invention, photonic crystals (K1–Kn) are positioned on a common optical waveguide (2). In this context, each photonic crystal (K1–Kn) is tuned to reflect or deflect the signals of one wavelength and to transmit the signals of other wavelengths, unattenuated. The specific arrangement of the photonic crystals (K1–Kn) on the waveguide (2) and the specific arrangement of the deflecting elements in the photonic crystal are defined, in the process, as a function of the dispersion to be compensated for between the individual wavelengths.

The approach of the present invention makes it possible to assemble permanently set or controllable photonic dispersion compensators of a high quality, which are approximately 1000 times shorter than conventional diffraction gratings.

8 Claims, 5 Drawing Sheets

METHOD USING PHOTONIC CRYSTALS FOR THE DISPERSION COMPENSATION OF OPTICAL SIGNALS OF DIFFERENT WAVELENGTHS WHICH ARE TRANSMITTED TOGETHER

The present invention is directed to the field of dispersion compensation as applied to co-transmitted optical signals having different wavelengths, in optical communications networks.

In optical communications networks set up in known methods heretofore, one installed, almost exclusively, standard single-mode fibers having an attenuation of about 0.4 dB/km and a dispersion minimum at 1310 nm.

To an increasing degree, the wavelength range of around 1550 nm is used for optical communications. This is due to the lower attenuation of approximately 0.2 dB/km, the increasing use of wavelength division-multiplex transmission, and the availability of a virtually perfected optical-fiber light amplifier, the EDFA (erbium doped fiber amplifier), which can be used to amplify several channels simultaneously within a broad range of around 1550 nm.

One deficiency of the above approach is that the transmission bandwidth and the amplifier distances are limited by the high dispersion of standard single-mode fibers of about 17 ps/nm×km at 1550 nm. Therefore, for longer transmission routes and bandwidths in the Gb/s range, it is necessary to install dispersion-compensating elements.

It is generally known to use dispersion-compensating fibers (DCF) which exhibit a high negative dispersion. -100 ps/nm×km is given as a typical value for the dispersion of a DCF. Accordingly, 17 km of DCF are needed to compensate for the dispersion of a 100 km long standard single-mode fiber. The compensation fibers are wound onto spools, which must be at least 10 cm in diameter to avoid loss of curvature. There are several drawbacks associated with using a dispersion-compensating fiber DCF for dispersion compensation:

A substantial length of a relatively expensive, special fiber is needed.

The fiber spool has large dimensions. This can lead to problems in line repeater stations or in cable jointing chambers, particularly when working with multi-core optical cables.

A supplementary attenuation is added. Due to their special core structure, dispersion-compensating fibers exhibit an attenuation of about 0.5 dB/km, i.e., a fiber length of 17 km yields an attenuation of about 9dB.

The above described properties and possible applications of dispersion-compensating fibers DCF, as well as the wavelength division-multiplex transmission and optical-fiber light amplifiers are described in detail in "Optische Telekommunikationssysteme" by H. Hultzsch, Damm Publishers, Gelsenkirchen (1996) p. 123 and pp. 296–298.

Another dispersion compensation method is based on the use of optical fiber gratings (see likewise in "Optische Telekommunikationssysteme" by H. Hultzsch, Damm Publishers, Gelsenkirchen (1996) pp. 152–153). However, optical fiber gratings of about one meter length are required to compensate for dispersion over broad wavelength ranges, e.g., the EDFA range of 1530 nm–1570 nm. The manufacturing of very long optical fiber gratings having the necessary tolerances with respect to the grating constants and the requisite long-term stability is expensive and is still in the development stage.

The technical objective of the present invention is directed to an economical approach that requires little overall space to compensate for the dispersion of co-transmitted optical signals having different wavelengths $\lambda$.

The achievement of the objective in accordance with the present invention is based on the use of photonic crystals Photonic crystals are periodic arrays of dielectric materials having high and low dielectric constants, alternately disposed as one-, two-, or three-dimensional gratings having periods of $\lambda/3$ and rod or cubic diameters of $\lambda/6$. See J. D. Joannopoulus et al.: Photonic Crystals: Molding the Flow of Light, ISBN 0-691-03744-2 (1995).

In accordance with the present invention, co-transmitted optical signals of different wavelengths which, after propagating through a line section, exhibit dispersion-induced transit-time differences, are coupled via an optical fiber input E into an arrangement configured as a network, which is made up of photonic crystals K1 through Kn positioned one after another on an optical waveguide 2. Photonic crystals K1 through Kn are, therefore, optically connected to one another. Photonic crystals K1 through Kn are formed in such a way that they reflect or divert signals of a specific wavelength and allow signals having other wavelengths to pass through, unattenuated. For example, the formation of first photonic crystal K1 is such that it exclusively reflects the signals of a first wavelength. Optical signals of other wavelengths pass through photonic crystal K1, unattenuated, and are coupled into the downstream photonic crystal K2. Of those signals transmitted through first photonic crystal K1, the subsequent, second photonic crystal K2 reflects, in turn, only those signals having a second wavelength. It likewise permits the signals having other wavelengths to pass through. In accordance with this principle, the signal continues to be passed on by a photonic crystal to a further photonic crystal until the signals of all wavelengths have been reflected by photonic crystals K1 through Kn assigned to them.

Since the positive dispersion value of the signals coupled into the optical fiber input is known for the individual wavelengths, path lengths, which are afflicted by negative dispersion in the array made up of successively ordered photonic crystals K1 through Kn, are defined in accordance with the individual wavelengths, are dimensionally designed to alter or completely cancel the dispersion differences of the signals of the individual wavelengths. Before the signal of a defined wavelength is reflected in one of the successively ordered photonic crystals K1–Kn, it has already traveled a path length up to the element reflecting the defined wavelength in the photonic crystal and acted upon by such a negative dispersion This path length is defined by the distance between optical fiber input E and the reflecting mirror in photonic crystal K1 through Kn in question.

The dispersion-compensated signals of different wavelengths reflected by the photonic crystals are again coupled into a shared optical fiber output A to be retransmitted by a suitable module, such as an optical circulator 1.

The method of the present invention shall now be explained in greater detail on the basis of five exemplary embodiments.

Assuming the case where optical signals transmitted with different wavelengths $\lambda_i$, e.g., three wavelengths $\lambda_i$, $\lambda_{i+1}$, $\lambda_{i+2}$, exhibit dispersion-induced transit-time differences after propagating through a line section, the specific embodiments are especially directed to once again compensating for these transit-time differences. However, these approaches also include the option of setting a predistortion including defined transit-time differences for the signals of the individual wavelengths, for example for the wavelengths $\lambda_1$, $\lambda_{i+1}$, $\lambda_{i+2}$.

FIG. 1 depicts an arrangement for compensating for dispersion, where the optical signals afflicted by transit-time differences are coupled via a shared optical fiber input E into an optical circulator 1. The optical signals afflicted by transit-time differences are coupled by optical circulator 1 into a module made up of photonic crystals KS1 through KSn which are disposed one after another as selective reflection filters on a waveguide 2.

In this context, each of photonic crystals KS1 through KSn is tuned to only reflect the signals having a specific wavelength of those signals coupled in via optical circulator 1, but to allow the signals of the other wavelengths to pass through. It, is the actual transit-time difference of the signals of the particular wavelength that determines which photonic crystal KS1 through KSn is designed as a reflection filter for which wavelength. The greater the transit-time difference is, the longer the optical path must also be that the signal needs to travel until complete dispersion compensation is attained.

This path can be precisely calculated. In one exemplary embodiment including, for example, three different wavelengths, this would signify that photonic crystal KS1 only reflects the signals of wavelength i to optical circulator 1. The light of wavelengths $\lambda_{i+1}$, $\lambda_{i+2}$ is transmitted through photonic crystal KS1, unattenuated, to photonic crystal KS2. Photonic crystal KS2 is tuned to only reflect the signals of wavelength $\lambda_{i+1}$. The signals of wavelength $\lambda_{i+}2$ pass through, unattenuated, to photonic crystal KS3. Photonic crystal KS3 is tuned to only reflect the signals of wavelength $\lambda_{i+}2$. Consequently, all signals coupled in via optical circulator 1 are re-reflected to optical circular 1. The now dispersion-compensated signals having the three wavelengths $\lambda_i$, $\lambda_{i+1}$, and $\lambda_{i+}2$ are again coupled by optical circulator 1 into the shared, optical fiber output A, and retransmitted via appropriate downstream devices.

Figure 2:
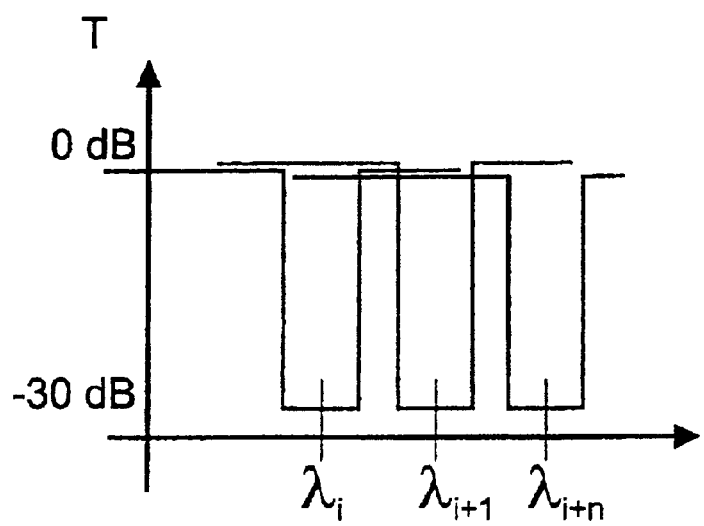

FIG. 2 illustrates the transmission as a function of the wavelength for the three photonic crystals KS1–KS3 designed as selective reflection filters.

Figure 3:
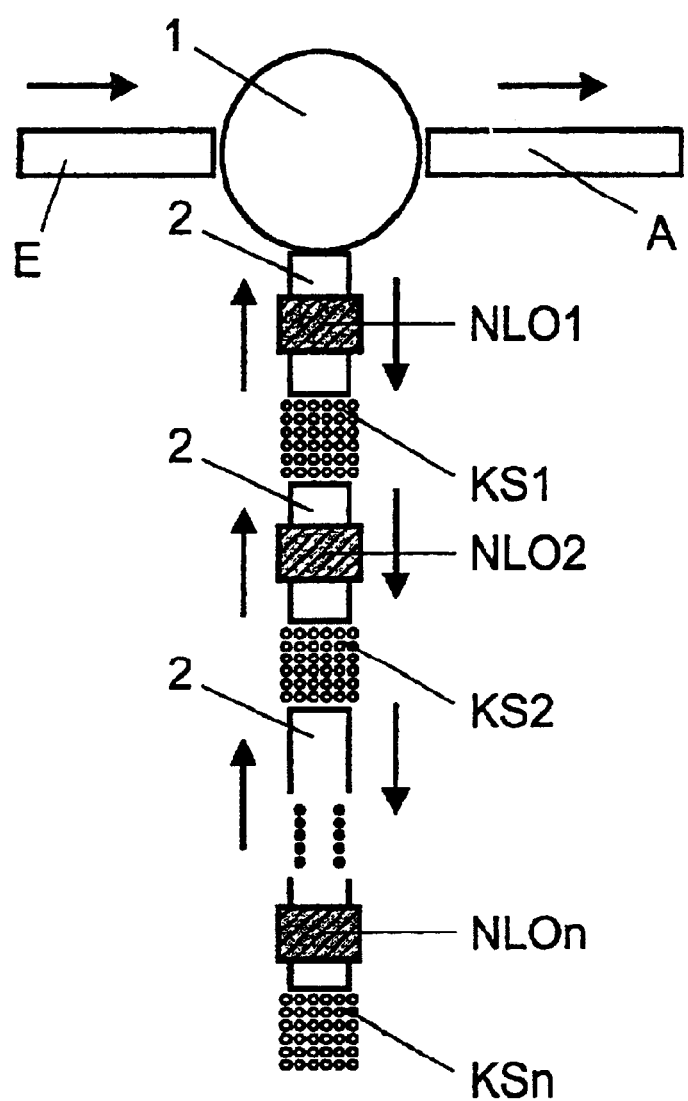

The specific embodiment pictured in FIG. 3 differs from the approach according to FIG. 1 in that tunable dispersion shifters NLO1–NLOn are additionally interposed in waveguides 2 between photonic crystals KS1–KSn designed as selective reflection filters. The tunable dispersion shifters NLO1–NLOn make further dispersion compensation possible in addition to the fixed path distances encumbered by negative dispersion. In this context, dispersion shifters NLO1–NLOn are preferably tuned to enable the sum of fixed and adjustable dispersion shifting to compensate for the dispersion differences among the individual wavelengths.

Figure 4:
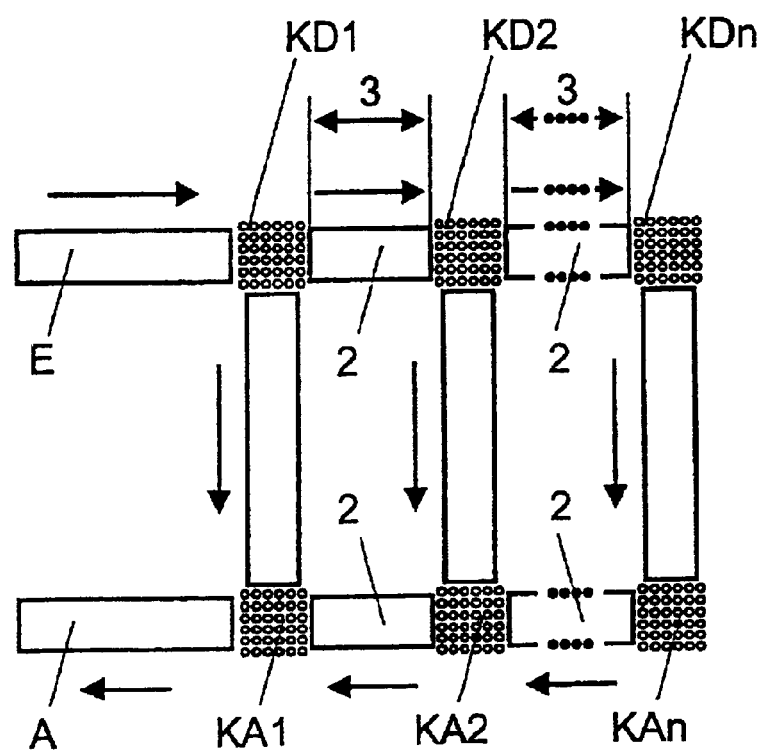

If The dispersion-compensating arrangement reproduced in FIG. 4 is directed to a specific embodiment that functions without optical circulator 1. In this example, photonic crystals KD1 through KDn are tuned to deflect signals of a particular wavelength. Photonic crystals KD1 through KDn, which are successively ordered on waveguide 2, are specifically designed as drop filters, which laterally deflect optical signals of a desired wavelength out of waveguide 2 and allow optical signals of other wavelengths to pass through to the downstream photonic crystal. The signals, which are filtered out laterally in dependence upon their wavelength by photonic crystals KD1 through KDn designed as drop filters, are optically transmitted via waveguide sections to photonic crystals KA1 through KAn designed as adders and are mutually coupled again via optical fiber output A to be further transmitted. The described arrangement eliminates the need for optical circulator 1 that is still required in the first exemplary embodiment. The signals of the various wavelengths are again present, without transit-time differences, at the output of photonic crystal KA1 designed as an adder. The dispersion-compensation arrangement pictured in FIG. 4, including photonic crystals KD1 through KDn designed as drop filters and photonic crystals KA1 through KAn designed as adders, is set up to compensate for the dispersion of the signals of the various wavelengths, in accordance with the dispersion to be expected at suitable geometric distances 3. In this instance, the arrangement is set up to include variable transmission (wavelength 1 through wavelength n), which is selected on the basis of the design and the period intervals of waveguides 2. Waveguides 2 are interrupted by regions in which the signals are coupled out of photonic crystals KD1–KDn in dependence upon their wavelength $\lambda_1$, due to the geometry of the three-terminal region, and are coupled again into the corresponding photonic crystals KA1–KAn designed as adders, and are summed All signals are then coupled again into optical fiber output A. In this manner, the transit-time displacement caused by dispersion is compensated for all signals. It is necessary to manufacture and install specially adapted components for the various paths of the network, as is the case in all dispersion-compensation techniques. A certain standardization can be achieved, for example, also by employing standardized distances between the stations where the dispersion compensation is carried out.

Figure 5:
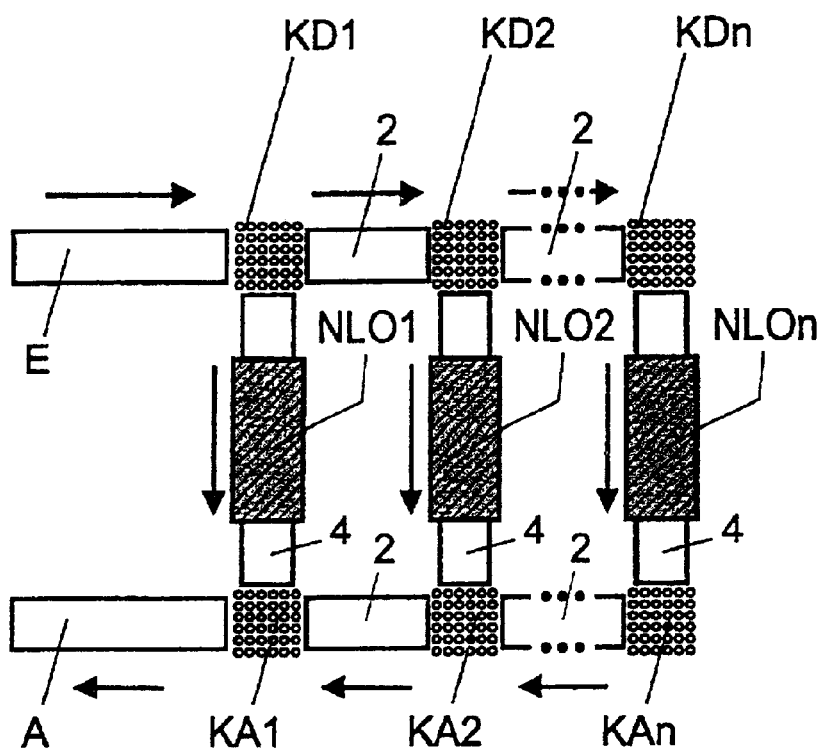

FIG. 5 shows an arrangement which essentially corresponds to that of FIG. 4. This arrangement is likewise made up of optical fiber input E, of photonic crystals KD1 through KDn designed as drop filters and configured on waveguide 2, of photonic crystals KA1–KAn designed as adders, and of the shared optical fiber output A.

Additionally situated on the optical paths between the deflecting outputs of photonic components KD1 through KDn designed as drop filters and the inputs of the photonic components KA1 through Kan designed as adders are dispersion shifters NLO1 through NLOn, whose dispersion-shifting effect is able to be individually tuned for each wavelength before the signal is fed back via photonic crystals KA1 through KAn, designed as adders, into shared optical fiber output A. The desired dispersion is set by applying different voltages at dispersion shifters NLO1–NLOn or through the action of other physical parameters, such as temperature, magnetic field, etc. In the process, dispersion shifters NLO1–NLOn can be loaded with one or a plurality of voltages and be made of a plurality of nonlinear optical materials. Dispersion shifters NLO1 through NLOn are preferably connected via planar waveguides 4, or also via photonic crystal waveguides, in each case to photonic crystals KA1 through KAn assigned to them as adders. By selecting appropriate materials and rating the voltage for the individual wavelengths one can roughly or even finely tune the desired additional dispersion. Nonlinear optical elements NLO of this kind make it possible for the set-up according to FIG. 5 to be adapted within certain limits to the particular conditions of the application. Thus, an arrangement in accordance with FIG. 5 has universal applicability. Non-linear, optical dispersion shifters NLO1–NLOn can be made, for example, of photonic crystal structures which are filled with liquid crystals. Also conceivable is the use of crystal rod or hole structures filled with non-linear, optical polymers. These structure are constructed in an electrical field that is tuned as a function of the required, non-linear optical dispersion shifting. In this context, the specific, optically non-linear dispersion shift is determined as a function of the compensation path length for the individual wavelengths.

If dispersion shifters NLO1 through NLOn are optically inserted between photonic crystals KD1–KDn, formed as drop elements, and photonic crystals KA1 through KAn functioning as adders, then the tuning is carried out separately for each wavelength. Therefore, this arrangement makes it possible to individually adjust the required dispersion shift for each individual wavelength.

Figure 6:
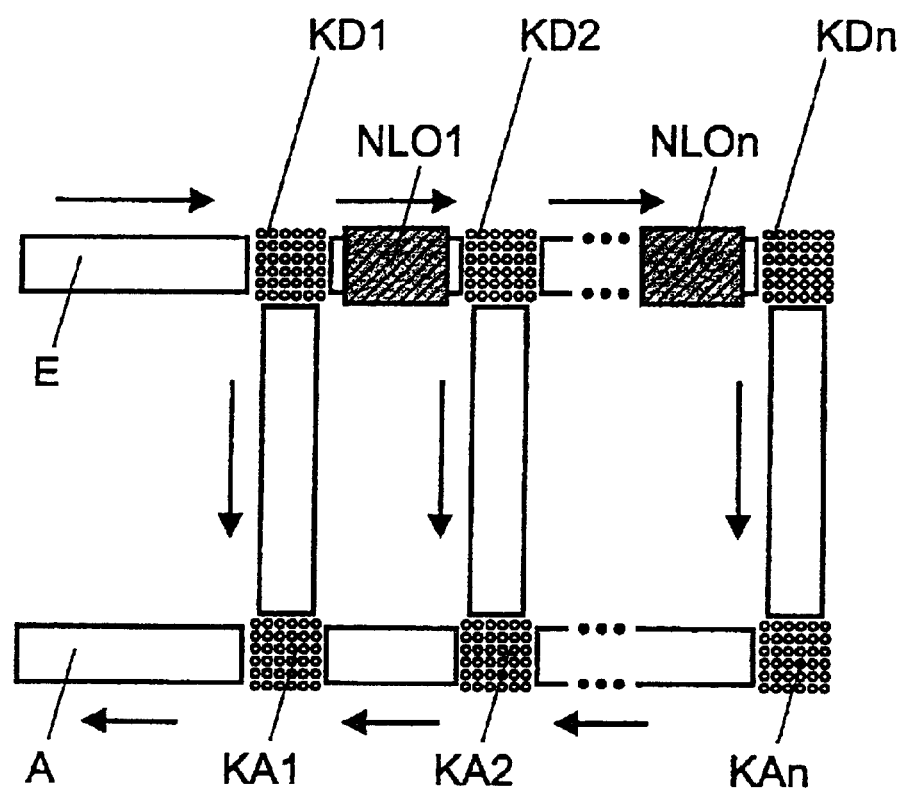

Alternatively, in another advantageous specific embodiment in accordance with FIG. 6, dispersion shifters NLO1 through NLOn can be positioned in the optical path (waveguide 2) between the individual photonic crystals KD1–KDn designed as drop filters. In this case, dispersion shifters NLO1–NLOn act on different wavelengths simultaneously. The action of dispersion shifters NLO1 through NLOn adds up in the process for the various wavelengths from dispersion shifter to dispersion shifter. The signals are fed back again via the waveguides between photonic crystals KD1–KDn designed as drop filters and photonic crystals KA1–KAn designed as adders, which sum up the signals and feed them back again into optical fiber output A.

The approach of the present invention makes it possible to assemble high-quality, photonic-crystal add-drop filters, which are approximately 1000 times shorter than conventional diffraction gratings that are configured as chirped gratings at a length of approximately 100 cm. The approach of the present invention makes it possible to construct a dispersion-compensation arrangement that is accommodated on a chip of a few centimeters in size. This chip component has the go advantage of a greater temperature stability, so that it can also be used for larger temperature ranges. In addition, in the specific embodiments according to FIGS. 4, 5, and 6, the need is eliminated for cost-intensive circulator 2. Besides improving operation, the present invention provides a much more economical approach than one based on the known, conventional structures. The electrically tunable dispersion shifters NLO1 through NLOn make it possible to adapt the approach on an individual basis to the particular requirements, even given different path lengths.

Solid-state waveguide technology can be used to implement the practical design of the dispersion-compensation arrangement of the present invention by employing three-dimensional additive lithography or electrolytic, light-supported etching of silicon, including appropriate patterning of the apertured mask.

Table of Reference Numerals

| | |
|---|---|
| E | optical fiber input |
| A | optical fiber output |
| 1 | optical circulator |
| 2 | waveguides |
| 3 | geometric distances between the photonic crystals |
| 4 | planar waveguides |
| K1-Kn | photonic crystals |
| KS1-KSn | photonic crystals designed as selective reflection filters |
| KD1-KDn | photonic crystals designed as drop elements |
| KA1-KAn | photonic crystals designed as adders |
| NL01-NL04 | dispersion shifters |
| λ | wavelength |

What is claimed is:

1. A method for compensating for the dispersion of co-transmitted optical signals having different wavelengths, wherein the transmitted optical signals are mutually coupled into an arrangement composed of optically interconnected photonic crystals, which are positioned one after another on at least one waveguide;

in each photonic crystal, only those signals of one wavelength are reflected or diverted, and the signals of the other wavelengths are transmitted, unattenuated, to be downstream photonic crystal;

wherein for the signals of each wavelength, the path length from the point of in-coupling to the point in the respective photonic crystal where they are reflected or defected, is acted upon by a negative dispersion, which alter or completely cancels the positive dispersion of the coupled-in signals, and the resulting signals of all wavelengths are subsequently further co-transmitted.

2. The method as recited in claim 1, wherein dispersion differences within the limits preset by the dispersion shifters can be compensated for by the dispersion shifter inserted into the waveguide.

3. An arrangement for compensating for the dispersion of co-transmitted optical signal having different wavelengths, wherein the arrangement is composed of successively ordered photonic crystals, a respective photonic crystal being permanently assigned to each wavelength as a function of its dispersion;

the photonic crystals are positioned on at least one common optical waveguide;

each photonic crystal is turned to reflect or deflect the signals of one wavelength and to transmitted the signals of other wavelengths, unattenuated;

the path length from the point of in-coupling to the point in the particular photonic crystal where the signals are reflected or deflected, being acted upon by a negative dispersion, with compensates for the positive dispersion of the coupled-in signals;

and the photonic crystals are optically connected to at least one module which holds ready the reflected or deflected signals of all wavelengths again for further transmission.

4. The dispersion compensation arrangement as recited in claim 3, wherein the arrangement is composed of at least two photonic crystals designed as selective reflection filters, disposed one after another on a wavelength, the crystals being connected via an optical circulator to the an optical fiber input and to an optical fiber output, and the first photonic crystal being designed as a reflection filter for the first wavelength and the second photonic crystal as a reflection filter for the second wavelength.

5. The arrangement as recited in claim 3, wherein to simultaneously roughly or finely tune the negative dispersion for various wavelengths, controllable dispersion shifters of non-linear optical materials are coupled in optically between the photonic crystal designed as selective reflection gratings.

6. The dispersion compensation arrangement as recited in claim 3, wherein the waveguide is composed of two opposing partial sections, the first partial section being assigned to the optical fiber input, and the second partial section being assigned to the optical fiber output; and at least two photonic crystal designed as drop elements are disposed one after another on the first fiber section, including outputs for laterally repelling signals of one wavelength; and two photonic components designed as adders are disposed one after another on the second fiber section; each photonic crystal designed as a drop element being optically connected via its output for laterally repelling, to the oppositely situated input of the photonic crystal designed as an adder.

7. The arrangement as recited in claim 3, wherein to roughly or finely tune the negative dispersion of each individual wavelength, controllable dispersion shifter NLO1 through NLOn of non-linear optical materials are coupled optically into the optical connection between the laterally disposed outputs of the photonic crystals (KS1–KDn) designed as drop elements and the photonic crystals (KA1–KAn) designed as adder.

8. The arrangement as recited in claim 3, wherein to simultaneously roughly or finely tune the negative dispersion for various wavelengths, controllable dispersion shifter (NLO1–NLO3) of non-linear optical material are coupled optically into the first waveguide section (2) upstream from the photonic crystal (K3 through K4) designed as drop filter.

* * * * *